United States Patent
McLeod et al.

(10) Patent No.: US 7,320,202 B2
(45) Date of Patent: Jan. 22, 2008

(54) STACKING OF LUMBER PIECES

(76) Inventors: James A. McLeod, Box 6, Vassar, Manitoba (CA) R0A 2J0; Murray Pisony, Box 87, Lundbreck, Alberta (CA) T0K 1H0

( * ) Notice: Subject to any disclaimer, the term of this patent is extended or adjusted under 35 U.S.C. 154(b) by 0 days.

(21) Appl. No.: 10/969,238

(22) Filed: Oct. 21, 2004

(65) Prior Publication Data
US 2005/0132667 A1  Jun. 23, 2005

Related U.S. Application Data

(63) Continuation of application No. 09/634,833, filed on Aug. 4, 2000, now abandoned.

(51) Int. Cl.
B65B 27/10 (2006.01)
A01D 43/08 (2006.01)

(52) U.S. Cl. .............. 53/390; 53/589; 53/391; 53/167; 53/148; 56/341

(58) Field of Classification Search .......... 53/390–392, 53/148, 154, 167, 589; 414/501; 56/341
See application file for complete search history.

(56) References Cited

U.S. PATENT DOCUMENTS

| | | | | |
|---|---|---|---|---|
| 2,971,591 A | * | 2/1961 | Silver et al. | 172/444 |
| 3,508,672 A | * | 4/1970 | Barnett et al. | 198/412 |
| 3,968,842 A | * | 7/1976 | Puch et al. | 171/11 |
| 4,039,434 A | * | 8/1977 | Croucher | 209/28 |
| 4,072,094 A | * | 2/1978 | Smitherman et al. | 100/3 |
| 4,127,070 A | * | 11/1978 | Dieringer et al. | 104/9 |
| 4,229,133 A | * | 10/1980 | Johnson | 414/789.5 |
| 4,269,242 A | | 5/1981 | Smith et al. | |
| 4,269,535 A | | 5/1981 | Schultz | |
| 4,393,763 A | * | 7/1983 | Sauer et al. | 100/2 |
| 4,399,745 A | * | 8/1983 | Jorgensen et al. | 100/2 |
| 4,467,712 A | * | 8/1984 | Fincham | 100/8 |

(Continued)

FOREIGN PATENT DOCUMENTS

CA   2241682   2/1999

*Primary Examiner*—Rinaldi I. Rada
*Assistant Examiner*—Gloria R. Weeks
(74) *Attorney, Agent, or Firm*—Adrian D. Battison; Michael R. Williams; Ryan W. Dupuis

(57) ABSTRACT

An apparatus for picking, conveying, stacking and bundling lumber pieces from the ground for example for removing stacked support lumber during laying of a pipe line comprises a tracked vehicle to which is attached a frame carrying a transport conveyer along the side of the vehicle forwardly and downwardly toward the ground. At the forward picking end is provided a picker roller for lifting the lumber pieces from the ground. On one side of the picker roller is provided a drive conveyer which is generally vertical and operable in forward and reverse direction to orient the pieces. On the side opposite to the drive conveyers provided a vertical blade with a rearwardly inclined inner portion which blade can pivot inwardly to push the lumber pieces toward the drive conveyer and to enclose and squeeze the pieces to a position inward of the side of the conveyer. Behind the vehicle is mounted a stacking section which arranges the pieces in a row and then stacks part of the row on top of another part to form the stack. The stack passes through a frame which clamps the pieces together to squeeze the stack and also to wrap the stack with a strapping carried into place by a chain.

15 Claims, 9 Drawing Sheets

U.S. PATENT DOCUMENTS

| | | | |
|---|---|---|---|
| 4,483,245 A * | 11/1984 | Fetters | 100/7 |
| 4,487,120 A * | 12/1984 | Barstow | 100/40 |
| 4,520,720 A | 6/1985 | Urban et al. | |
| 4,537,010 A | 8/1985 | Mojden et al. | |
| 4,741,116 A | 5/1988 | Engle et al. | |
| 4,796,821 A | 1/1989 | Pao et al. | |
| 4,892,458 A * | 1/1990 | Proulx | 414/791.6 |
| 5,175,981 A * | 1/1993 | Gombos et al. | 53/502 |
| 5,340,269 A | 8/1994 | Caridis et al. | |
| 5,377,479 A * | 1/1995 | Wilstrand et al. | 56/14.3 |
| 5,540,422 A * | 7/1996 | St. John et al. | 270/52.18 |
| 5,596,784 A | 1/1997 | Tolmachoff | |
| 5,640,832 A | 6/1997 | Black, Jr. | |
| 5,794,416 A | 8/1998 | Rahman | |
| 5,893,701 A | 4/1999 | Pruett | |
| 5,934,861 A | 8/1999 | McLeod | |
| 5,944,477 A | 8/1999 | Shill | |
| 5,944,479 A | 8/1999 | Kanaya et al. | |
| 6,076,342 A | 6/2000 | Loehr | |
| 6,152,026 A * | 11/2000 | Simpson | 100/70 R |
| 6,241,073 B1 | 6/2001 | McAllister et al. | |
| 6,279,295 B1 * | 8/2001 | Girard et al. | 53/397 |
| 7,127,985 B2 * | 10/2006 | Standlee | 100/3 |

* cited by examiner

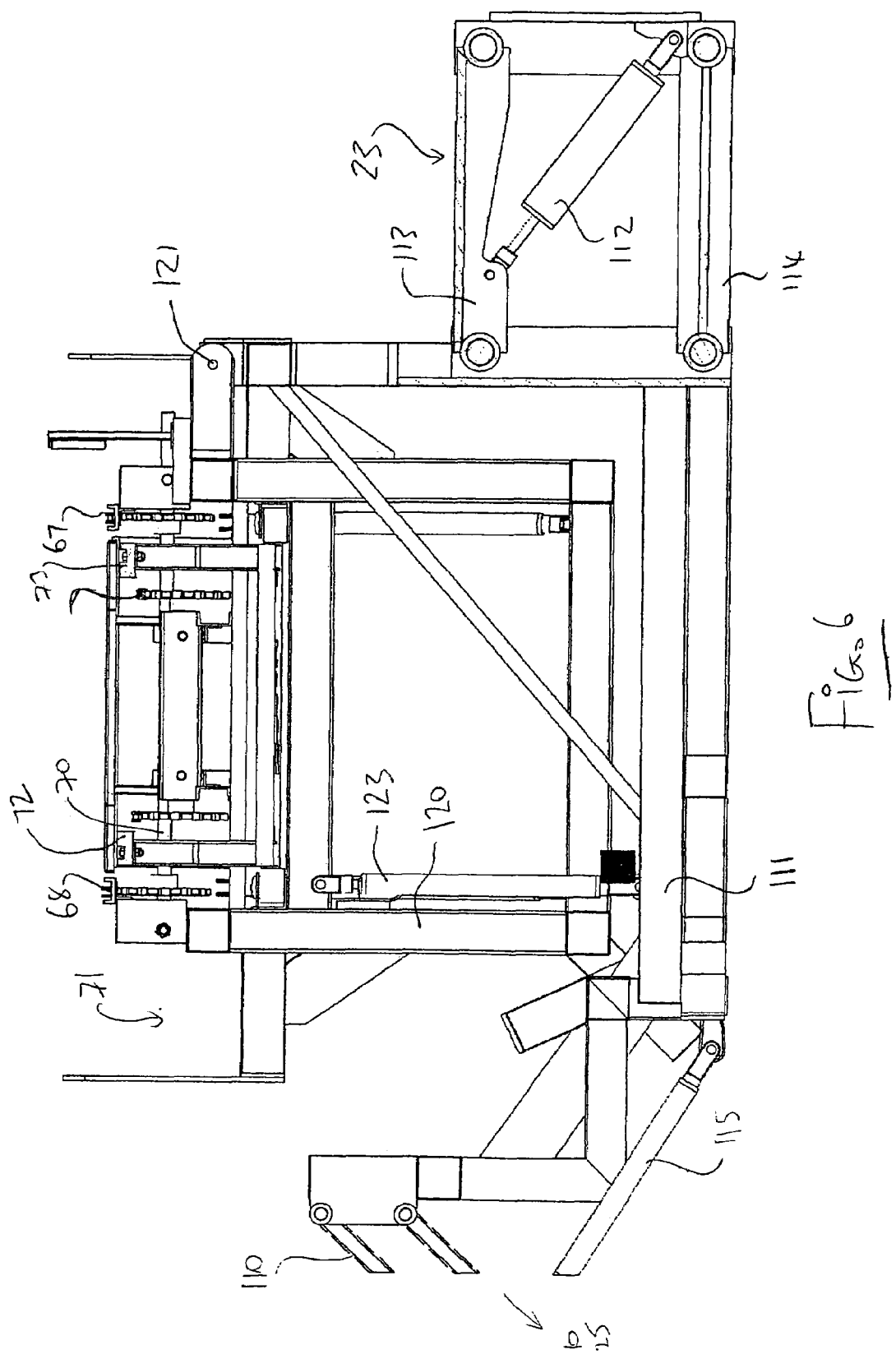

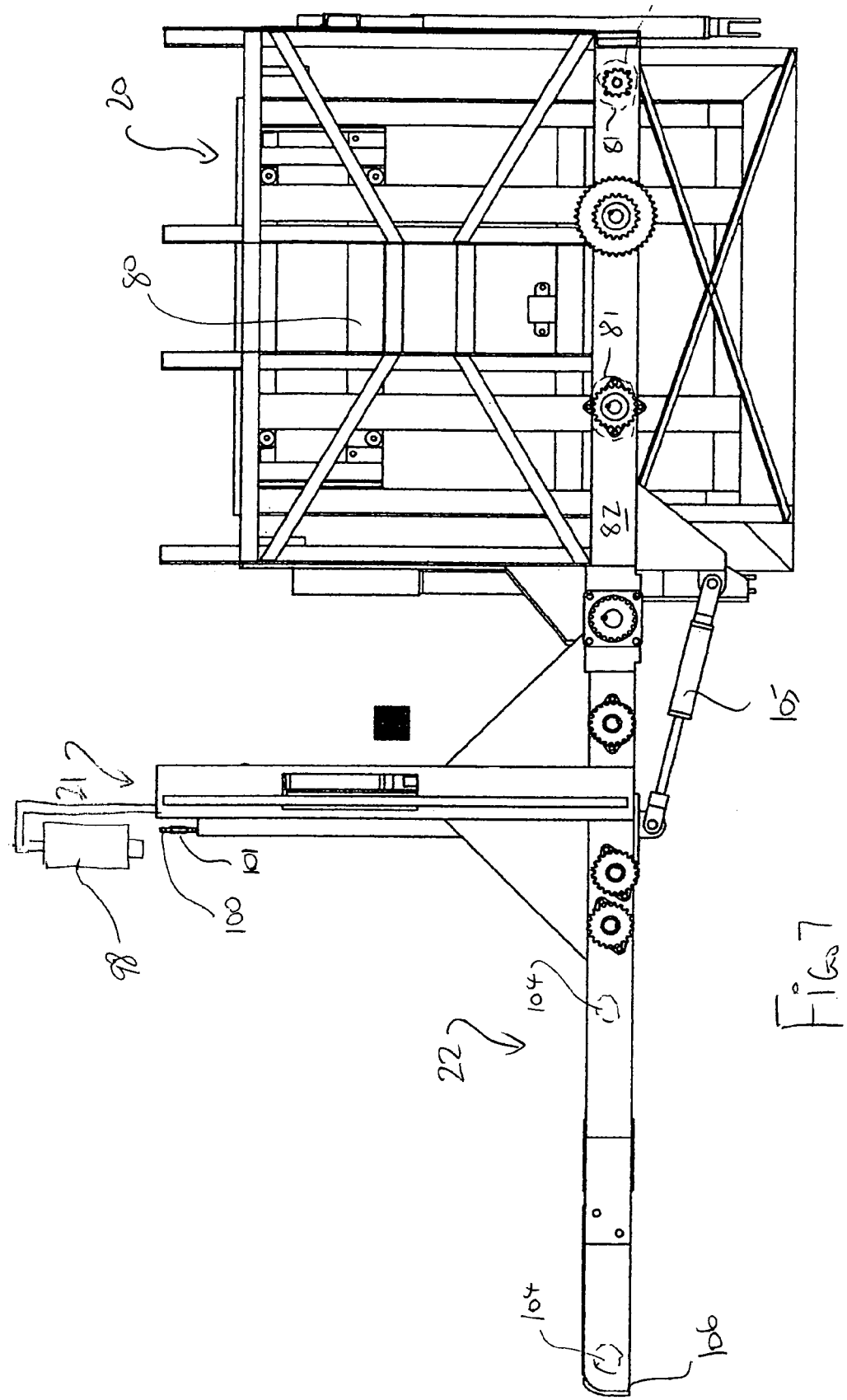

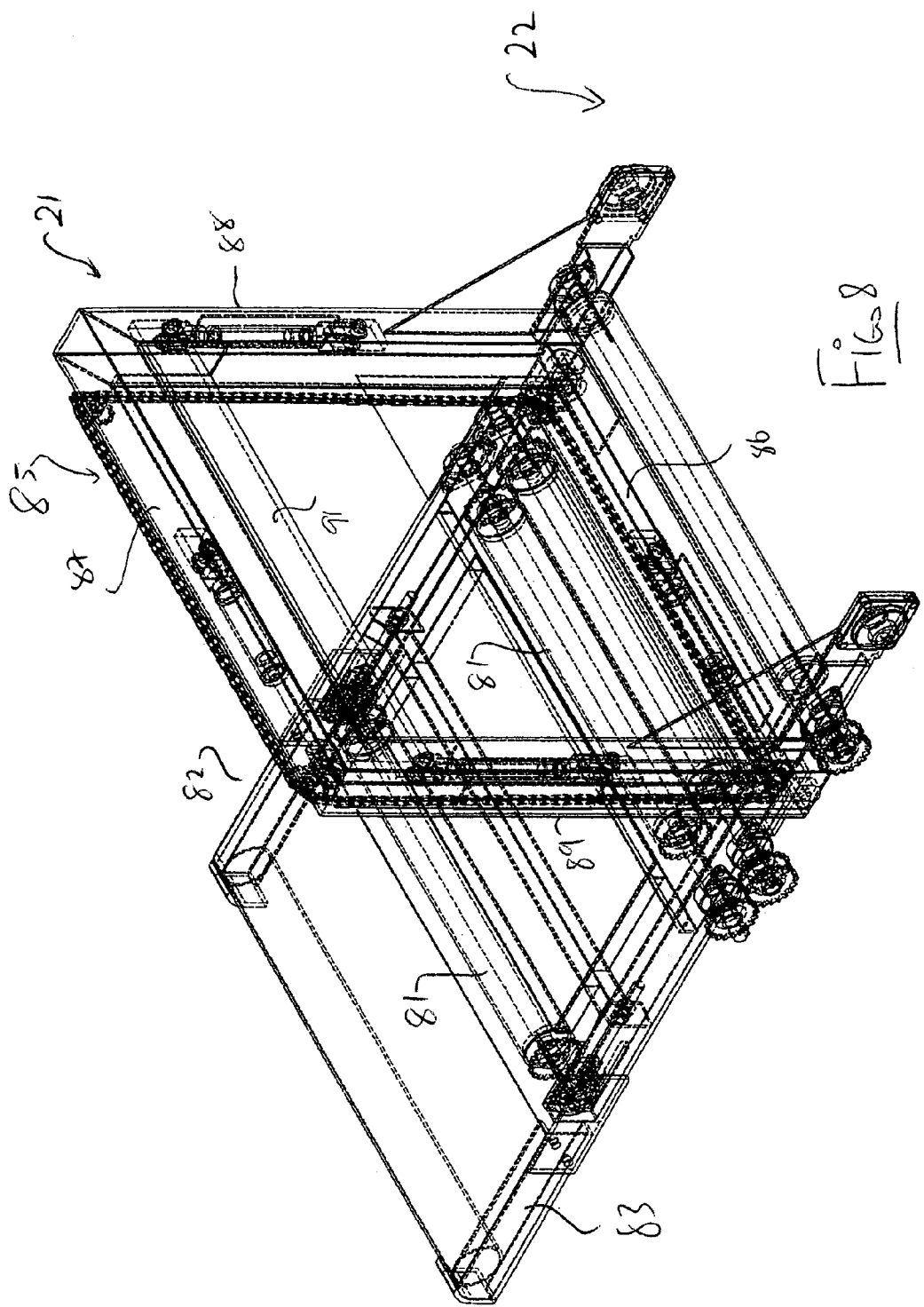

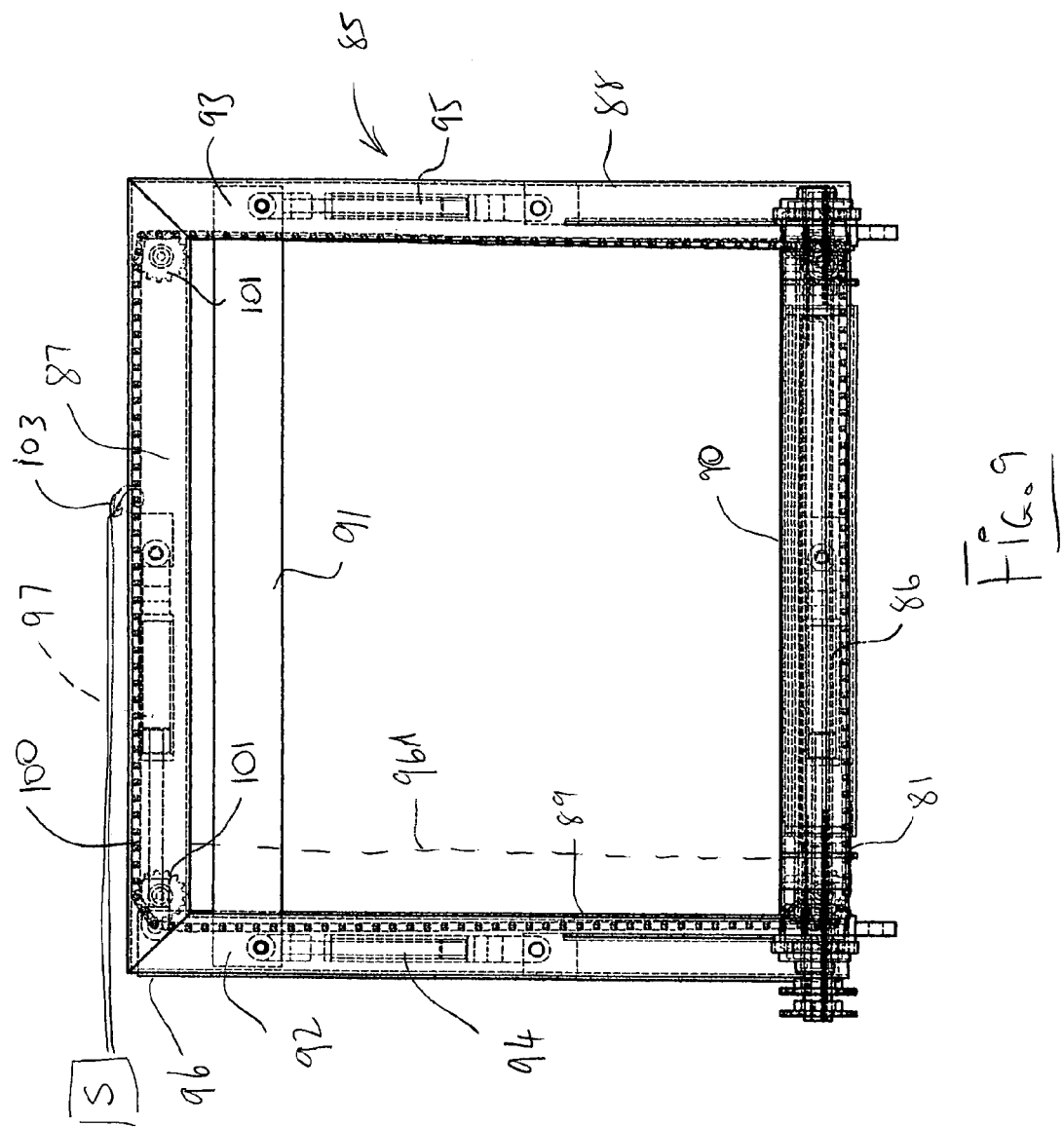

STACKING OF LUMBER PIECES

This invention is a continuation application of application Ser. No. 09/634,833, filed Aug. 4, 2000 now abandoned.

This invention relates to an apparatus for stacking lumber pieces particularly but not exclusively those known as skids used in laying pipe-line.

BACKGROUND OF THE INVENTION

In laying pipe such as in a gas or oil pipe line it is conventional that lengths of the pipe are supported end to end on stack lumber pieces known as "skids" so that the pipe lengths can be held at a required height to be supported and aligned end to end for welding of the lengths prior to feeding of the completed welded length into a trench adjacent to the stacks.

Thus the pipe lengths are initially arranged end to end and are properly aligned by arranging sufficient of the lumber pieces to support the pipe length at the required height. With the pipe lengths so supported, the welding is carried out to form the lengths into a continuous length for laying in the ground.

The pipe is then lifted from the supporting stacks and deposited in a continuous action along its length into the ground by a train of tracked vehicles at spaced positions along the length, each carrying suitable operation elements so that the continuous pipe length can be fed from the supported position into the trench. At some point during laying or after the pipe has been laid, it has been necessary to remove the lumber pieces from the stacks and to collect the lumber pieces into a transport container for removal from the site and preferably for re-use at a further location along the pipeline.

A the present time the lumber pieces which are conventionally either four or five feet in length and 6 inches by 4 inches in cross section are lifted manually and handled manually for stacking onto a transport container. This manual process is expensive and time consuming since it requires a gang of laborers working hard and commanding relatively high wage rates. In many cases that stack has been disturbed so that the pieces are strewn and in some cases the pieces are compressed into the ground by the tracks of the passing vehicles.

While this step relatively minor one in the process of laying the pipe line, it constitutes a significant expense and therefore provides a significant opportunity for manufacturer of an effective machine which will carry out this step while eliminating or reducing the manual labor involved.

In U.S. Pat. No. 5,934,861 issued Aug. 10th 1999 to one of the present inventors, which corresponds to Canadian Application 2,241,682 published 26th Feb. 1999, a first proposal was made for a machine which picks up the pieces and conveys them to a transport truck to one side of the machine. While this proposal included a number of basic principles which are used herein and which form the basis of this invention, yet further improvements have been made herein to provide a machine with improved operation and ergonomics

SUMMARY OF THE INVENTION

It is in accordance with one aspect of the invention one object of the present invention to provide an improved machine for collecting elongate pieces from the ground which can be used for example in collecting the stacks or skids for supporting pipe lengths prior to laying of the pipe.

According to one aspect of the invention there is provided an apparatus for collecting, stacking and bundling elongate pieces comprising;

a frame arranged for attachment to a vehicle for moving in a direction of working movement across the ground between stacks on the ground of the elongate pieces to be collected;

an unscrambling and stacking assembly on the frame including a row former for receiving the elongate pieces from the conveyer and for unscrambling and aligning the pieces side by side in a row and including a transfer section for stacking rows on top of one another to form a stack of the rows;

and a bundling assembly on the frame for wrapping the stack of the rows with a bundling material;

the unscrambling and stacking assembly and the bundling assembly being mounted on the frame for transportation with the vehicle across the ground such that the collected elongate pieces are discharged behind the vehicle in a bundle.

Preferably the apparatus includes a picking assembly on the frame for lifting the elongate pieces from the ground and a transport conveyer on the frame having a forward end for receiving the elongate pieces from the picking assembly and arranged to transport the elongate pieces rearwardly from the picking assembly to the unscrambling and stacking assembly.

However in an alternative arrangement, the unscrambling, stacking and bundling assemblies without a picking assembly can be provided on a vehicle for transportation to the pieces to be collected. The pieces can then be picked up manually and simply dumped into an unscrambling hopper or can be dropped onto a conveyer for feeding to the hopper. This arrangement can be used where the picking assembly cannot operate due to space or other limitations and thus manual picking by laborers is necessary or where there is a large pile of the pieces which must be reached by a cherry picker type arrangement.

Preferably the stacking assembly and the bundling assembly are mounted on the frame so as to be positioned behind the vehicle and the conveyer extends along one side of the vehicle from the picking assembly forwardly of and to one side of the vehicle to the stacking assembly behind the vehicle.

Preferably the transfer section of the stacking assembly includes a conveyer extending across the vehicle behind the vehicle from the conveyer on the one side to the bundling assembly on the other side and wherein the bundling assembly is arranged to discharge the bundle rearwardly of the vehicle from the other side.

Preferably the row former of the stacking assembly includes a hopper into which the pieces are deposited from the conveyer and an elevator for lifting the pieces one at a time from the conveyer, the hopper having an end wall transverse to the feed direction of the conveyer against which the pieces are fed by the conveyer and two side walls each on a respective side of the end wall with the side walls converging inwardly and downwardly to a bottom apex lying along the feed direction of the conveyer and the elevator being arranged up one side wall with piece engaging members thereon for engaging and lifting one piece at a time for discharging the pieces over the top of said one side wall onto a transfer conveyer.

Preferably the apparatus includes an end guide for engaging ends of the pieces at one side of the transfer conveyer to push the ends into alignment on the transfer conveyer.

Preferably the transfer section of the stacking assembly includes a transfer conveyer for forwarding the pieces side by side in a row, a transfer rack for lifting a row of a predetermined number of the pieces from the transfer conveyer and moving the row generally horizontally from the transfer conveyer, and a stack support for receiving the moved rows deposited thereon and for moving the received rows downwardly to receive a next row on top of a previous row.

Preferably the transfer rack comprising a pair of parallel horizontal forks which can be raised for engaging the pieces and can be moved horizontally from the transfer conveyer to the stack support for conveying the engaged pieces.

Preferably the stack support comprises a pair of horizontal parallel forks which can be lowered to deposit the stack onto a roller conveyer for discharge.

Preferably the stacking assembly and bundling assembly are mounted on a sub-frame portion of the frame which is arranged for pivotal movement relative to the frame and relative to the conveyer about a horizontal axis transverse to the direction of movement of the vehicle to maintain the stacking assembly and bundling assembly substantially level as the vehicle moves Preferably the frame is attached to a rear of the vehicle by a four point hitch and is supported relative to the ground on two wheels extending rearwardly from the frame allowing the angle of the whole frame including the picking assembly to the vehicle be adjusted to accommodate changes in ground contour as a rigid forwardly projecting construction by adjustment of the four point hitch. In an alternative arrangement, the pick-up assembly can be connected to the front of the conveyer, by a pivot hinge defining a transverse horizontal pivot axis preferably at the front picking roller thus allowing the picking assembly to be lifted upwardly and downwardly to accommodate changes in ground contour while the front of the conveyer at the picking rollers rolls on or floats over the ground.

It is a further object of the invention in accordance with a second aspect to provide an improved bundling assembly for an apparatus of this type.

According to a second aspect of the invention there is provided an apparatus for stacking and bundling elongate pieces comprising;

a stacking assembly including a row former for receiving the elongate pieces for aligning the pieces side by side in a row and including a transfer section for stacking rows on top of one another to form a stack of the rows;

and a bundling assembly for wrapping the stack of the rows with a strapping material;

the bundling assembly comprising:

a conveyer for forwarding the stack;

a rectangular surrounding frame structure for surrounding and enclosing the stack on the conveyer and including a bottom frame piece, a top frame piece and two side frame pieces;

and a feed member for transporting the strapping material around the compressed stack in the frame for clamping of ends of the strapping material to form a loop, the feed member comprising an endless loop member extending around the frame and drivable along its length around the frame with a coupling member at one point on the loop member for receiving and transporting an end of the strapping material around the stack as the loop member passes around the frame.

Preferably the frame includes a first clamping assembly movable into engagement with one side of the stack for compressing the stack side to side and a second clamping assembly movable into engagement with the top or bottom of the stack for compressing the stack top to bottom;

Preferably the endless loop member comprises a chain which is carried on sprockets at the corners of the frame.

Preferably the first clamping assembly comprises a first clamping bar mounted on one side frame member and movable relative thereto by a hydraulic drive between the clamping bar and the frame member and wherein the second clamping assembly comprises a second clamping bar mounted on the top frame member and movable relative thereto by a hydraulic drive between the second clamping bar and the top frame member.

BRIEF DESCRIPTION OF THE DRAWINGS

In the accompanying drawings, which illustrate an exemplary embodiment of the present invention:

FIG. 6 Is a cross sectional view on an enlarged scale along the lines 6-6 of FIG. 2.

FIG. 7 is a side elevational view of the stacking and bundling section of the apparatus of FIG. 1.

FIG. 8 is an isometric view of the bundling section of the apparatus of FIG. 1.

FIG. 9 is a front elevational view of the bundling section of the apparatus of FIG. 1.

DETAILED DESCRIPTION

Figure 1:
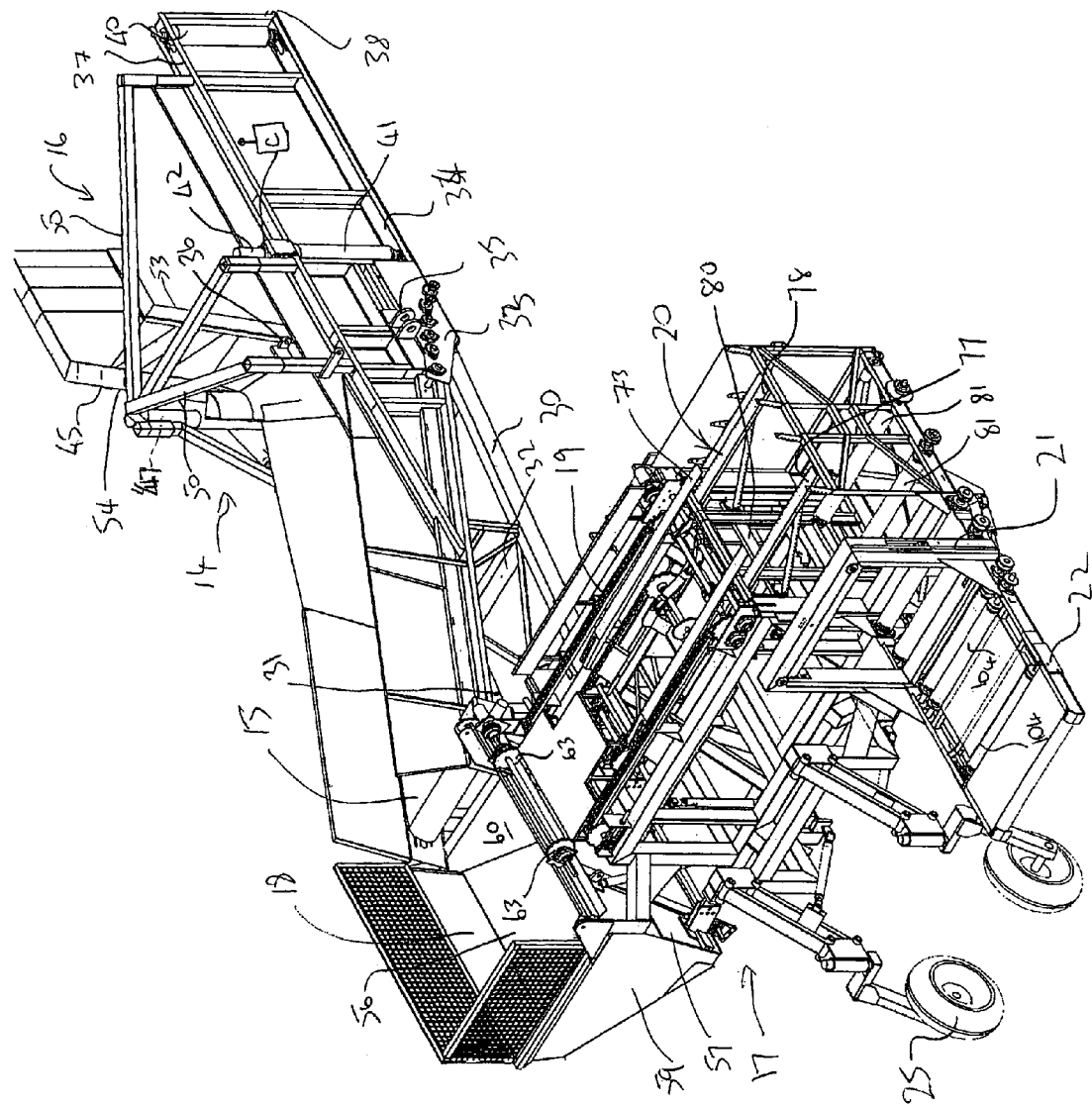
FIG. 1 is an isometric view from the rear and one side of an apparatus according to the present invention.

The apparatus comprises a conventional track vehicle 10 having a cab and drive assembly (not shown) and tracks 12 by which the vehicle can move across the ground in a direction of working movement indicated at 13.

The apparatus further includes a picking and conveyer assembly 14 having a main conveyer 15 attached to and arranged rearwardly of a picker 16. At the rear of the conveyer 15 is provided a stacking assembly generally indicated at 17 including an unscrambling hopper 18, a row conveyer 19 and a stacking assembly 20. The apparatus further includes a bundling assembly 21 including a discharge ramp 22. The elements provided by the picking and conveyer assembly 14, the stacking assembly 17 and the bundling assembly 21 are all mounted on a frame for common movement with the vehicle 10 in the working direction 13. The frame carrying these elements is attached to the vehicle by a four point hitch 23 at the rear of the vehicle and by a coupling assembly generally indicated at 24 at the side of the vehicle and inwardly of the picking and conveyer assembly 14. The frame is carried on a pair of rear wheels 25 projecting rearwardly from the frame behind the row conveyer 19 and inwardly of the discharge ramp 22.

The apparatus is arranged to be moved by the vehicle 10 from place to place for picking up pieces of lumber and primarily lumber stacks used as skids for supporting a pipeline during initial welding and prior to insertion of the pipeline into the ground. When a collection of pieces is encountered, the picking assembly 16 is operated to collate the pieces so that the pieces can move in groups or sequentially along the conveyer 15 for subsequent unscrambling and stacking into a rectangular stack whereupon the pieces are formed into a bundle, wrapped and discharged on the ground. The vehicle is operated by a driver who moves the vehicle forwardly and operates the picking assembly. The stacking operation is controlled by a second operator standing on the frame behind the stacking assembly who ensures the proper operation of the stacking assembly, the bundling assembly and the discharge.

In an alternative arrangement (not shown), the stacking, bundling and discharge assembly can be used without the picking and conveyer assembly in an arrangement in which the picking is effected manually by a manual laborer or a gang of such laborers who act to pick and lift the pieces, particularly in the arrangement where the pieces are difficult to lift mechanically due to their obstructed location or due to their being embedded in the ground. In such an arrangement the stacking assembly may be turned through 90° and placed upon a trailer behind a vehicle so that the manual laborers simply place the pieces into the unscrambling hopper 18 or alternatively onto a short conveyer conveying the pieces into the unscrambling hopper. Such an arrangement can also be used with a picking assembly in the form of a mechanically operated grapple which lifts the pieces from a large pile of the pieces for formation into stacks which are bundled and discharged. Again therefore this device in combination with a grapple type picking assembly is portable on a suitable trailer or frame carried by a vehicle so that it can be moved to a pile or collection of the pieces for stacking.

The conveyer 15 includes a conveyer belt having a forward end 26 and a rear end 27 and is mounted on a plurality of support rollers 28 so that an upper run of the belt carries the pieces rearwardly and upwardly from the forward end 26 into the unscrambling hopper 18 at the rear end 27.

In front of the conveyer belt is provided a plurality of picking rollers 28 arranged in a row in front of the front roller of the conveyer. In the embodiment shown there are five picking rollers but it will be appreciated that this number can be increased or decreased in accordance with the aggressiveness of the picking action required. Each picking roller comprises a transverse shaft together with a plurality of longitudinally spaced picking discs. The picking discs have angularly spaced spikes so that reverse rotation of the rollers tends to lift the pieces upwardly and onto the top of the rollers for carrying the pieces rearwardly onto the belt. The discs of each shaft are arranged so that they interleave with the discs of the next adjacent shaft. In this way the shafts and the discs combine to form a grid or grate over which the pieces pass while allowing dirt and other materials to fall through the grid that is between the shafts and in between the discs.

The shafts are arranged so that the diameters increase from the smallest diameter at the front picking roller through to a larger diameter at the rear picking roller. The discs have a substantially common outside diameter so that the spikes of the discs of the first picking roller are larger and therefore more aggressive than the spikes of the last picking roller.

The picking rollers are mounted on the support frame so that they are arranged at or only slightly above ground level so as to prevent the pieces from passing underneath the picking rollers. The front picking rollers therefore act to lift the pieces off the ground or in some cases out of embedded position within the ground by the spikes of the disc engaging into the pieces and lifting them upwardly onto the top of the rollers for movement rearwardly onto the conveyer.

The conveyer is mounted on a frame section of the main frame having a first side 30 and a second side 31. The frame sides are interconnected by transverse beams 32 to form a rigid frame structure holding the frame sides at a fixed spacing each on a respective side of the conveyer. The frame sides define support plates 32 for receiving the bearings of the rollers 28 and the picking rollers 29. The bottom of the side walls is defined by a horizontal skid plate 33 which engages the ground and slides along the ground to locate the side wall and thus the picking section at ground level for engaging the pieces on the ground. The side wall 30 includes mounting lugs 35 and 36 for receiving support elements of a coupling 24 which connects the side of the vehicle to the sidewall 30. The coupling element 24 includes a link which allows the frame to pivot inwardly and outwardly about a horizontal axis parallel to the direction 13 so that the picking section can pivot outwardly and upwardly or outwardly and downwardly to accommodate changes in ground contour. In addition the angle of the bottom skid 34 about a horizontal pivot axis transverse to the direction 13 can be changed by actuating the four point hitch connection 23 and/or by lifting the linkage 24.

The pickup section 16 includes a first fixed side wall 37 which forms an extension of the side wall 30 of a conveyer and projects directly forwardly therefrom to a front edge 38. Thus the side wall 37 of the pickup is directed along the line of motion 13 so that it can be moved by forward movement of the vehicle to a position along one side of a pile of the pieces to be collected An inside face of the side wall 37 is defined by a belt 39 carried on rollers 40 and 41 and driven by a motor 42. The rollers stand vertical within the side wall 37 thus defining the belt 39 as the inside surface of the wall which can thus face and contact pieces within the pickup 16. The motor 42 is actuated by a control C shown schematically so that the motor can be driven in a forward direction and reverse direction thus causing movement of the belt in a direction forwardly and rearwardly respectively of the direction 13. The belt can thus be actuated by the driver of the vehicle who can see the pieces within the pickup area and can see how those pieces are oriented thus selecting a direction of movement of the belt to reorient the pieces to best move them to a position for lifting by the pickup rollers 29 for forwarding along the conveyer. In some cases the pieces are overlying and disorganized so that they can tend to jam within the opening area of the conveyer and thus a selection of one of the direction of movements or indeed operation in both forward and rearward movements alternately can cause the pieces to become reoriented so that one end is clearly in advance of the other to allow that piece to enter onto the conveyer.

On the other side of the pickup 16 is provided a movable side wall 44. This includes a first wall portion 45 and a second wall portion 46 at the forward outer end of the portion 45. The portions 45 and 46 are connected rigidly and both are pivotable about a vertical post 47 operated by a cylinder 48. The post 47 is mounted on a support element 49 carried on the side wall 31 at the forward end thereof. The mounting 49 includes a series of transverse braces 50 which extend across from posts on the side wall 30 so as to maintain the post 47 vertical and in fixed position. The post is located at a position spaced outwardly and forwardly from the forward end of the side wall 31 that is at the first pickup roller 29.

The forward most part of the side wall 31 includes a top edge 51 which is located outwardly of the bottom edge so that the forward most part is inclined upwardly and outwardly toward the top edge 51. This top edge extends rearwardly to a point 52 where it intersects with the vertical side wall 31 at a position partway along the conveyer.

The first portion 45 of the side wall 44 is also inclined upwardly and outwardly so that it has a bottom edge 53 which is in advance of the top edge 54. This forms in effect a blade arrangement similar to that of a bulldozer with a leading front edge which scrapes over the ground surface in the forward movement of the pickup section.

Figure 2:
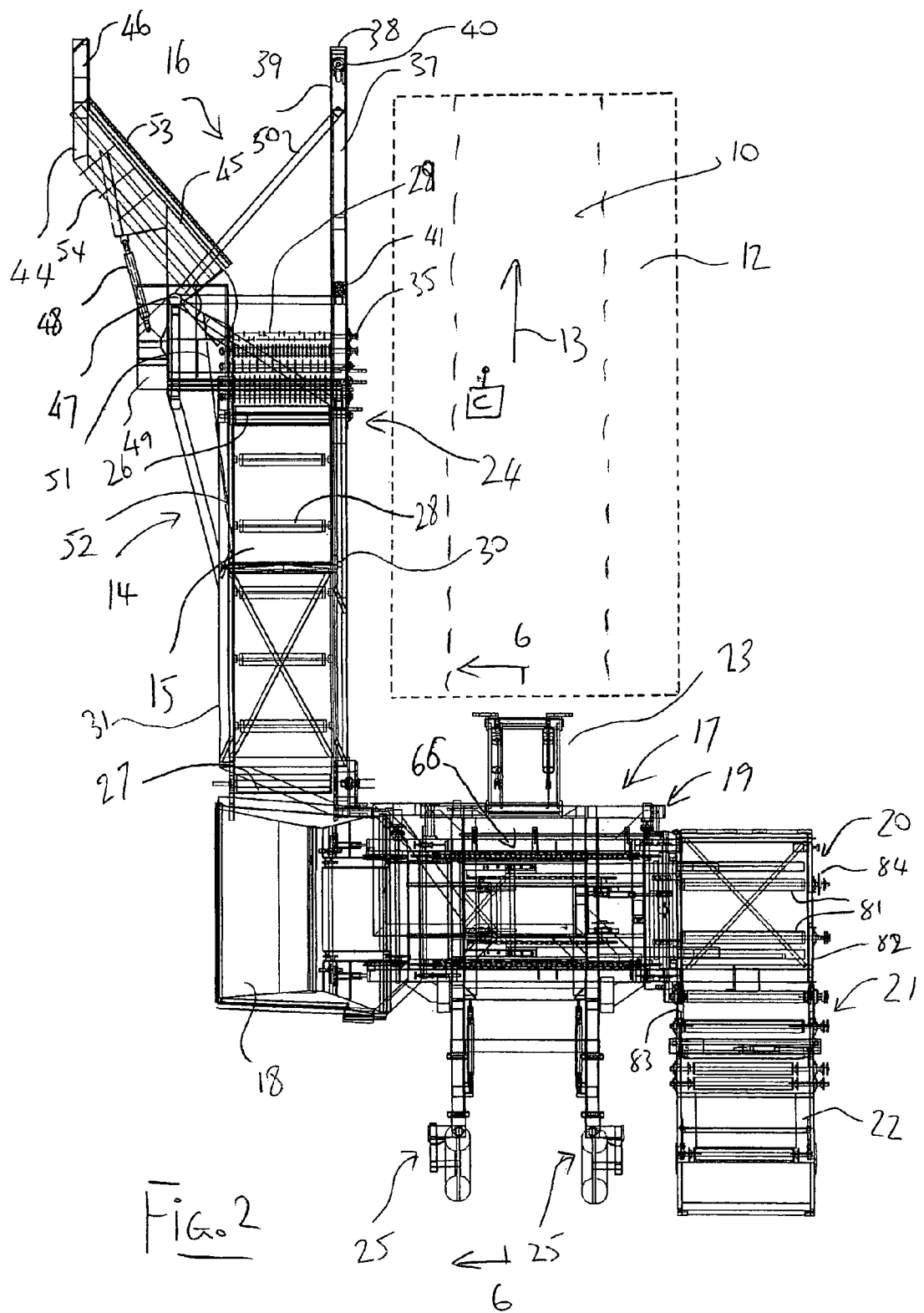
FIG. 2 is a top plan view of the apparatus of FIG. 1.

In the open position of the pickup shown in FIG. 2, the first portion 45 is thus inclined forwardly and outwardly to act in effect as a blade projecting to one side of the conveyer and scraping material toward the conveyer for picking up by the pickup rollers onto the conveyer. Thus any individual pieces can simply enter the mouth defined by the pickup section and are diverted inwardly and rearwardly by the inclined blade 45 to the conveyer. The outer portion 46 in this outer position extends directly forwardly parallel to the side wall 40.

Figure 3:
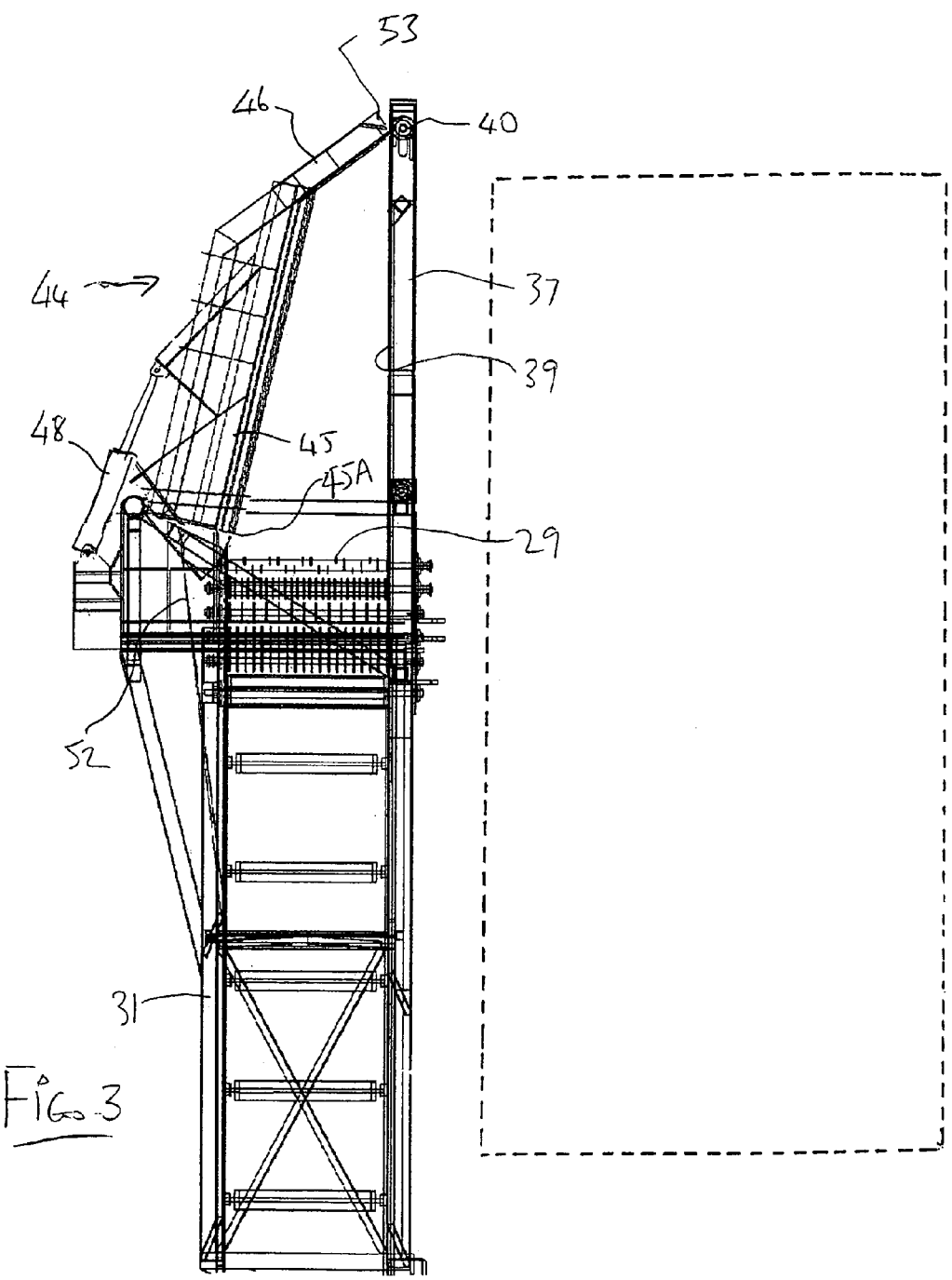
FIG. 3 is a top plan view of the apparatus on an enlarged scale relative to that of FIG. 2 and showing only the pick-up and conveyer section in a closed position of the pick-up section.

In a situation where a number of pieces have simultaneously entered the pickup section, for example, in a disorganized pile of the pieces, in some cases the pieces become oriented simply by their cooperation with the inclined blade 45. However in other cases the pile is sufficiently disorganized and tangled that it cannot simply become reoriented by the engagement with the blade 45. In this situation the movable side wall 44 is moved to a position shown in FIG. 3 in which the side wall 44 is moved inwardly by actuation of the cylinder 48 to a position in which a front edge 53 of the outer portion 46 is located at or adjacent the front roller 40 of the side wall 37. This acts to enclose the pieces between the blade 45 and the belt 39. This squeezing action, which may take a number of strokes of the cylinder to be completed as the pieces become more organized, reduces the volume within which the pile is located thus tending to push the ends of the pieces forwardly and rearwardly acting to tend to align the pieces within the smaller volume between the closed sidewalls. At the same time the closing action tends to lift the pieces since they slide up the inclined wall 45. The volume of the pile is squeezed so that it has a width slightly less than that of the conveyer thus allowing the squeezed and more oriented pile to enter onto the conveyer over the pickup rollers 29. It will be noted that as shown in FIG. 3, the bottom edge of the blade 45 is located inwardly of the side of the conveyer so that it tends to squeeze the pieces inwardly to a position inward of the side wall 31 of the conveyer. The rearmost edge 45A of the side wall blade 44 is spaced slightly inwardly from the adjacent bottom edge of the side wall portion of the side wall 31. The inclination of the forward portion of the side wall to the top edge 52 is at as similar angle to the inclination of the blade so that any lifted pieces can slide from the blade 45 onto the side wall 31 at the inclined portion so that they can be moved rearwardly and then drop onto the conveyer by sliding down the inclined portion of the side wall.

While the pieces are enclosed within the smaller volume shown in FIG. 3, the belt 39 can be operated forwardly and/or rearwardly to assist in aligning the pieces while squeezed into the pile within the smaller volume. In this way substantially any pile of pieces, regardless of their tangled and transverse orientations can be reoriented into a small enough and narrow enough volume so that they can be transported either one at a time or as a part or complete pile rearwardly along the conveyer.

In practice, therefore, in some cases the pieces are somewhat separated along the conveyer and in other cases, the pieces are arranged in overlying tangled pattern on the conveyer as they move rearwardly along the conveyer.

Figure 4:
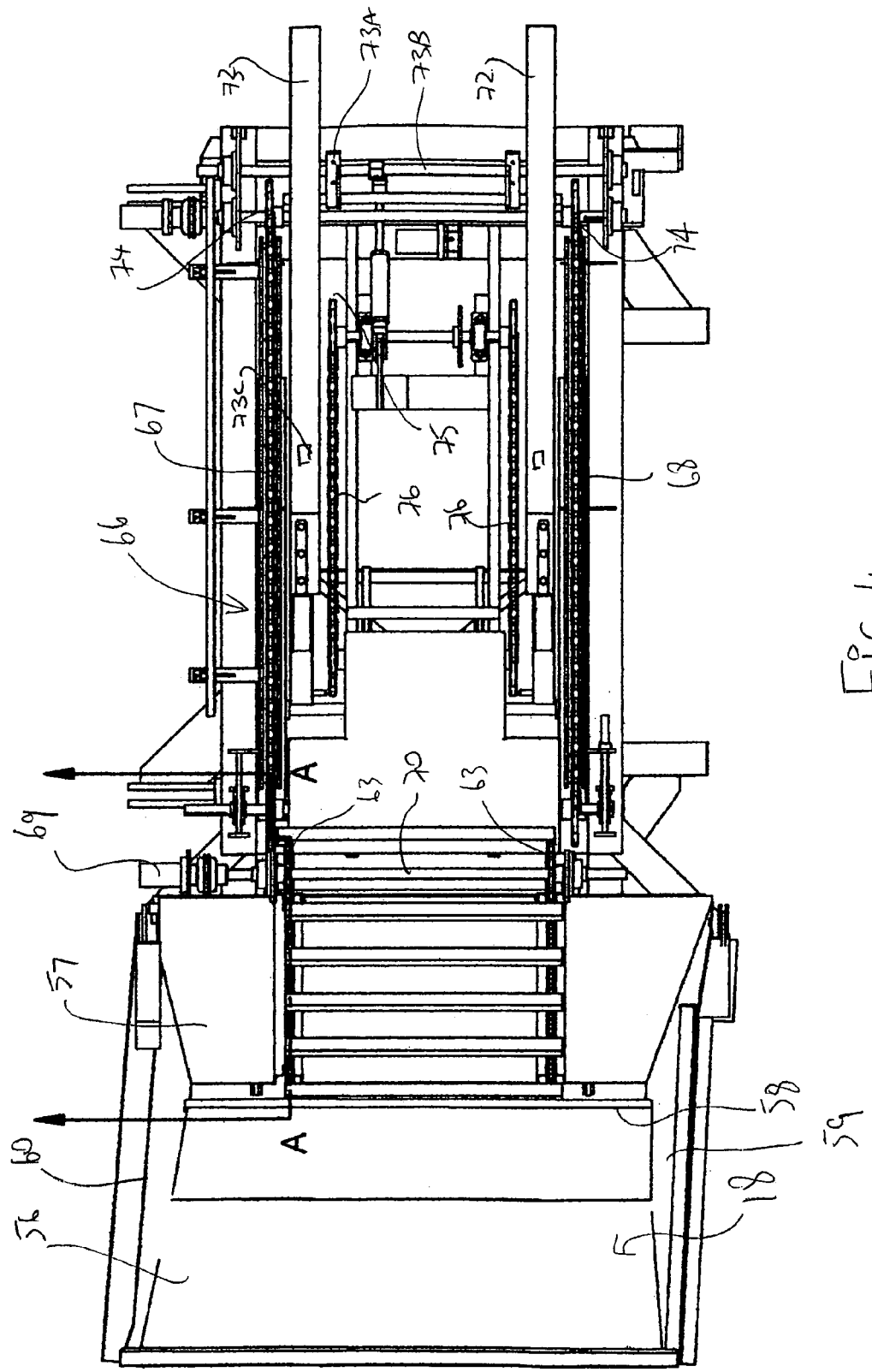
FIG. 4 is a top plan view of the apparatus on an enlarged scale relative to that of FIG. 2 and showing only the unscrambling hopper and transfer conveyer section.
Figure 5:
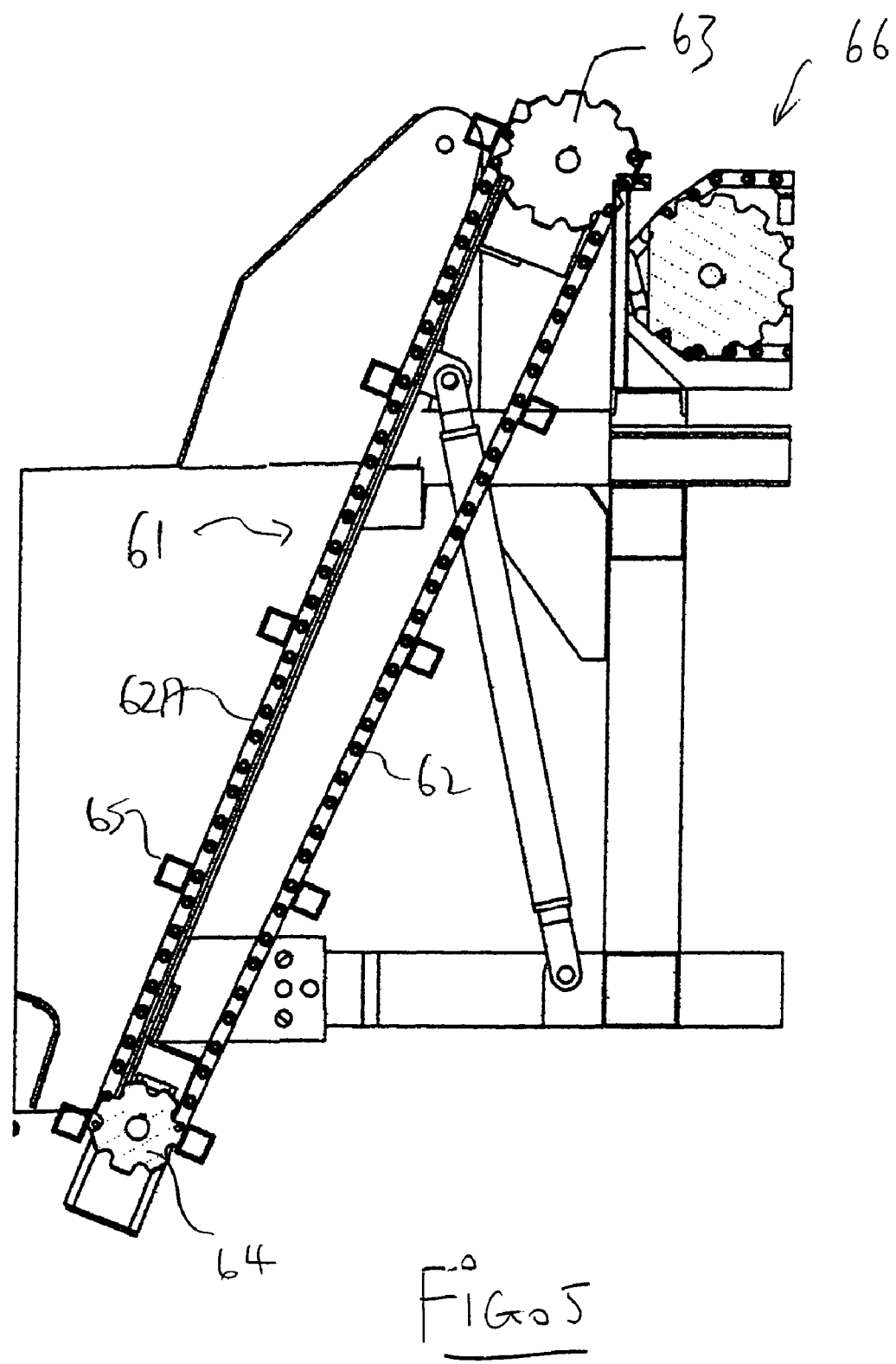
FIG. 5 is cross sectional view along the lines A-A of FIG. 4 showing the hopper and elevator.

Turning now to FIGS. 4 and 5 there is shown the unscrambling hopper 18 into which the pieces from the conveyer 15 are discharged. As set forth above the pieces can arrive one at a time or can arrive with a number of pieces overlying and transverse to one another. In general the length of the pieces is greater than the width of the conveyer since the pieces tend to be either 4 feet or 5 feet in length and the width of the conveyer is of the order of 2.5 to 3 feet. The pieces therefore are generally longitudinal of the conveyer but of course can be diagonal to the conveyer. The pieces as they arrive at the top end 27 of the conveyer are thrown from the conveyer into the unscrambling hopper 18.

The unscrambling hopper includes two side walls 56 and 57 which are inclined to an apex 58 which is longitudinal of the hopper and thus longitudinal of the conveyer. The hopper further includes a front end wall 59 and a rear end wall 60 which are parallel and generally at right angles to the walls 56 and 57. The end walls 59 and 60 are vertical and define a length of the hopper which is slightly longer than the longest pieces which are to be accommodated so that the pieces can be aligned lengthwise along the hopper. The pieces arriving at the hopper are therefore thrown into the hopper with one end in advance of the other so that the first end hits the end wall 59 allowing the pieces to fall into the hopper and slide down one or the other of the side walls 56 57 to the apex 58. This arrangement therefore aligns the pieces so that each piece has its longitudinal direction longitudinal of the hopper and parallel to the apex 58. If the pieces are well spaced, the pieces will end up at the apex. If a collection of pieces simultaneously enters the hopper from a pile, the pieces will form a stack at the bottom of the hopper but all oriented with their longitudinal axis parallel to the apex 58.

A conveyer 61 includes two chains 62 each carried on an upper drive sprocket 63 and a bottom idler sprocket 64 so that a lifting run 62A of the chains moves in a direction generally parallel to the side wall 59. The chains carry transverse abutment bars 65 which project outwardly that is forwardly of the runs 62A and inwardly of the side wall 57 thus acting to grasp the pieces from the pile at the bottom of the hopper and tending to lift those pieces out of the hopper along the sidewall 57 for discharge over a top edge of the side wall 57 onto the row forming section 19. The abutment bars 65 bridge between the two chains 62 and thus pass over the two sprockets 63 as best shown in FIG. 1 where the pieces are discharged from the top of the conveyer 61 onto a row forming conveyer 66.

The row forming conveyer 66 comprises a pair of conveyer chains 67 and 68 onto which the pieces are deposited so that they lie transverse to the chain generally at right angles to the chain as they are dropped off from the conveyer 61. An end alignment belt can be provided on one side of the conveyer 66 for engaging the ends of the pieces and pushing those ends in a direction at right angles to the conveyer chain 67 and 68 thus acting to align all of the ends of the pieces. This alignment belt is not shown for convenience of illustration and is preferably positioned at the beginning of the chain 67 adjacent the motor 69 for driving the sprockets 63 on the shaft 70.

Thus the pieces are fed generally in a row side by side with all of the pieces sitting on the conveyer chain 67 and 68. In the event that more than one pieces is carried on a respective one of the abutment 65, the pieces may end up with one on top of another on the conveyer 66 and this problem is overcome manually by the operator standing on a frame 71 behind the chain 68 to ensure that the stacking process operates effectively. The pieces thus are fed along the conveyer 66 on the chain 67 and 68 over a pair of lifting plates 72 and 73 which are normally positioned below the chains thus lying the pieces to be carried across the plates toward the forward end of the chains 67 and 68 at sprockets 74 of those chains. At the forward end of the plate 72 and 73 is provided a pair of stoppers 73A which halt forward movement of the pieces so that the pieces which are being carried by the chains back up against these stoppers to form a row of the pieces side by side extending back toward the unscrambling hopper.

When sufficient of the pieces have been accumulated to form a complete row of the pieces, the plates 72 and 73 are lifted by an actuating mechanism 73B which simultaneously lifts the plates and lowers the stoppers. The plates 72 and 73 are then carried forwardly on a carriage system 75 driven by chains 76. Thus the support plates 72 and 73 lift the accumulated pieces off the conveyer chains and a rear dog 73C on each of the plates acts to engage a rearmost one of the accumulated row and separate that from the pieces remaining on the chains to carry those pieces forwardly beyond the chains into the stacker 20.

The stacker 20 includes a pair of horizontal spaced supports 77 and 78 mounted on a carriage 80 carried underneath the row conveyer. Thus the stacker arms 77 and 78 can be moved vertically downwardly as each row of pieces is carried forwardly by the plates 72 and 73.

The stacker arrangement therefore is located at the end of the conveyer 66 so that each row of pieces is carried beyond the conveyer 66 by the plate 72 and 73 which are lifted and moved forwardly carrying the required accumulated pieces of the row over the stacker. When the carriage carrying the plates is moved to its forward most position, the end most piece of the row is aligned with those pieces previously stacked. In this position the actuating mechanism previously operating the lifting of the plates is lowered thus simultaneously raising the stop members to prevent the pieces from being retracted with the retracting plates as they move back to their position underneath the conveyer 66. This leaves the row of pieces on top of the previously stacked pieces sitting on the arms 77 and 78.

The stacking action continues by carrying each row in turn onto the stacking arms 77 and 78 until those arms reach the bottom of the stacking assembly to a position at which they are lowered below conveyer rollers 81 of the stacking assembly thus leaving the stack sitting on the conveyer rollers 81 at the bottom of the stacking assembly.

The rollers 81 bridge a pair of side rails 82 and 83 of the stacking assembly and discharge ramp 22. The rollers 81 are driven by a chain connected across chain wheels 84 at the side rail 82 so as to forward the completed stack from its position aligned with the conveyer 66 into the bundling assembly 21 and onto a first part of the discharge ramp 22. In this way the completed stack is moved away from its initial position allowing the stacking arms 77 and 78 to be immediately raised back to the uppermost position for receiving the next row of pieces from the conveyer 66.

The bundling assembly 21 comprises a rectangular frame 85 including a bottom horizontal rail 86, a top horizontal rail 87 and two side posts 88 and 89. The top and bottom rails are spaced by a distance sufficient to receive the height of the stack and the posts are spaced by a distance sufficient to receive the width of the stack. Thus the elements are spaced slightly greater than the compressed dimensions of the stack so as to allow the stack to pass through the rectangular frame even the event that it is slightly loose or expanded in dimension by distorted or slightly twisted pieces.

The bottom rail 86 has an upper surface 90 positioned at or slightly below the top surface of the rollers 81 so as to allow the stack to be carried over the top surface 90 and into the area defined by the posts and rails.

A top clamping arm 91 lies parallel to the top rail 87 and extends across between ends 92 and 93 at the posts 89 and 88 respectively. The clamping bar 91 is movable from a position in which it is retracted within a slot within the top rail 87 downwardly into engagement with a top surface of the stack. The clamping bar 91 is moved by a pair of cylinders 94 and 95 each arranged in a respective one of the posts 89, 88. The amount of movement of the clamping bar is sufficient to effect squeezing of the pieces within the stack so that the pieces are pressed together thus eliminating the spaces between the pieces and ensuring that they are fully aligned and in contact.

A second clamping bar 96 is arranged at right angles to clamping bar 91 but operates in a symmetrical manner in that it is movable from a position as shown retracted within the post 89 to a clamping position shown at dash line 96A in which it is pulled toward the post 88 to effect a similar clamping action on the sides of the stack. The vertical clamping bar 96 is operated by cylinders 97 in the top and bottom rails and slides in a slot in those rails at a position alongside but slightly offset from the clamping bar 91. In this way the two clamping bars act simultaneously and symmetrically to clamp the stack thus squeezing it between the clamping bar and the opposed element of the bundling frame.

With the stack thus clamped, the stack is wrapped by a length of strapping which is wrapped around the stack to form a loop and the two ends of the loop crimped by a manually operable strapping system schematically indicated at 98. Such strapping arrangements are commercially available in the form of a crimping head which acts to tighten the loop and simultaneously crimp or lock the two ends of the loop together so that the strapping is maintained fixed around the stack. The head 98 is operated by the operator standing on the operator frame.

The strapping material is carried around the stack by a chain 100. The chain extends around four sprockets 101 each mounted at a corner of the frame 85 so that the chain has four lengths each extending along a respective one of the frame members. One of the sprockets 101 is driven and the others are idlers so that the chain can be rotated around the frame so as to complete a single loop around the frame. The chain carries on one link a gripping member 103 around which an end of the strapping material can be engaged so that that end is carried with the chain as it moves around the frame thus carrying the end around the complete stack which is supported on the rollers 81 until the first end attached to the clamp 103 reaches the trailing end of the strapping material for engagement by the head 98. The operator can thus forward the end of the strapping material from a supply S carried on the frame 85. The chain 100 and the sprockets 101 is mounted on either the front face or the rear face of the frame so that the sprockets and the chain are alongside the frame and do not interfere with the movement of the stack through the frame and do not provide a dangerous projection outwardly beyond the frame.

When the stack is clamped and wrapped with the strapping material, the clamps are retracted into their respective frame member thus releasing the stack while maintaining the stack in tight bundled condition by the strapping material. The rollers 81 are then driven forwardly by the chain so as to move the stack from its position within the bundling frame onto the discharge ramp 22 where it can be held in position until it is required to be discharged onto the ground. The discharge ramp 22 includes idler rollers 104 on which the stack sits while the ramp is held in a horizontal position shown in FIG. 7. The ramp can then be lowered by actuating a cylinder 105 so that the rear end of the ramp 106 moves downwardly into contact with the ground thus allowing the stack to roll from the idler rollers 104 onto the ground for discharge and receipt of a further stack from the stacking assembly. As shown in FIG. 6, the rear wheels 25 are carried on a parallel linkage 110 attached to a rear of the main frame 111 on which the assembly sits. The frame section 111 of the main frame 24 is attached to the four point hitch 23. The hitch 23 includes a cylinder 112 operable between two parallel links 113 and 114 to raise and lower the frame section 111 on the wheels 25. The linkage 110 to the wheels 25 includes a spring coupling 115 which allows some suspension and floating action of the wheels relative to the frame section 111.

As previously explained the frame section 111 is a rigidly connected part of the frame 24 which attaches to the pickup and conveyer section. However the stacking section included in the conveyer 66 and the stacking arms on the vertical conveyer of the stacking assembly is mounted on a subframe section 120 separate from the frame section 111 and pivotally connected to the frame section 111 on a pivot pin 121. The height of the stacking section relative to the frame section 111 can be adjusted by a cylinder 123 under control of the operator standing on the frame 71. Thus the stacking section can be maintained substantially horizontal relative to a front to rear direction by pivoting action about the horizontal transverse pivot pin 121. Thus the driver of the vehicle controls the pickup assembly and the attitude of the main frame including the pickup assembly attached thereto. The driver thus controls the picking up, reorientation and feeding of the pieces along the conveyer. The rear operator standing on the frame 71 controls the stacking action by adjusting the height of the stacking frame to maintain it in an orientation which avoids the possibility of toppling of the pieces. In addition the stacking operator controls the feeding of the row of pieces of conveyer 66 and ensures that the pieces are properly carried onto the existing stack on the stacking arms. The operator then controls the feed of the finished stack through the bundling assembly and discharge.

While one embodiment of the present invention has been described in the foregoing, it is to be understood that other embodiments are possible within the scope of the invention. The invention is to be considered limited solely by the scope of the appended claims.

The invention claimed is:

1. Apparatus for collecting, stacking and bundling elongate pieces comprising:

a vehicle for moving in a direction of working movement across ground between stacks on the ground of the elongate pieces to be collected;

a frame arranged for attachment to the vehicle;

an unscrambling and stacking assembly mounted on the frame including a row former for receiving the elongate pieces and for unscrambling and aligning the pieces side by side in a row and including a transfer section for stacking rows on top of one another to form a stack of the rows;

and a bundling assembly mounted on the frame for wrapping the stack of the rows with a bundling material;

the unscrambling and stacking assembly and the bunding assembly being mounted on the frame for transportation with the vehicle across the ground;

the unscrambling and stacking assembly including a receiving section for the pieces which is mounted on the frame so as to be located on a first side of the vehicle;

the bundling assembly being mounted on the frame so as to be located on a second side of the vehicle opposite to the fist side and arranged to discharge the bundle rearwardly of the vehicle from the second side;

wherein the transfer section of the unscrambling and stacking assembly includes a transfer conveyer extending across the vehicle from the receiving section on the first side to the bundling assembly on the second side;

and wherein the transfer section of the unscrambling and stacking assembly includes a transfer rack for lifting a row of a predetermined number of the pieces from the transfer conveyer and moving the row generally horizontally from the transfer conveyer, and a stack support for receiving the moved rows deposited thereon and for moving the received rows downwardly to receive a next row on top of a previous row.

2. The apparatus according to claim 1 wherein the receiving section of the unscrambling and stacking assembly includes a feed conveyer and wherein there is provided a picking assembly on the frame for lifting the elongate pieces from the ground for deposit on the feed conveyer which is arranged to transport the elongate pieces rearwardly from the picking assembly to the unscrambling and stacking assembly.

3. The apparatus according claim 2 wherein the unscrambling and stacking assembly and the bundling assembly are mounted on the frame so as to be positioned behind the vehicle and the feed conveyer extends along one side of the vehicle from the picking assembly to the unscrambling and stacking assembly behind the vehicle.

4. The apparatus according claim 2 wherein the row former of the unscrambling and stacking assembly includes an unscrambling hopper into which the pieces are deposited and an elevator for lifting the pieces one at a time, the unscrambling hopper having an end wall against which the pieces are fed and two side walls each on a respective side of the end wall with the side walls converging inwardly and downwardly to a bottom apex and the elevator being arranged up one side wall with piece engaging members thereon for engaging and lifting one piece at a time for discharging the pieces over the top of said one side wall onto said transfer conveyer, the unscrambling hopper being arranged such that the side walls are parallel to the longitudinal direction of the feed conveyer and the end wall is transverse to the longitudinal direction such that the pieces are fed with one end first along the longitudinal direction of the feed conveyer for the end of the pieces to engage the end wall when discharged from the feed conveyer.

5. The apparatus according to claim 4 including an end guide for engaging ends of the pieces at one side of the transfer conveyer to push the ends into alignment on the transfer conveyer.

6. The apparatus according claim 2 wherein the unscrambling and stacking assembly and the bundling assembly are mounted on a sub-frame portion of the frame which is arranged for pivotal movement relative to a forward portion of the frame and relative to the feed conveyer about a horizontal axis transverse to the direction of movement of the vehicle to maintain the unscrambling and stacking assembly and the bundling assembly substantially level as the vehicle moves.

7. The apparatus according claim 6 wherein the sub-frame portion of the frame is attached to a rear of the vehicle by a four point hitch and is supported relative to the ground on two wheels extending rearwardly from the forward frame portion the frame allowing the angle of the picking assembly to the vehicle be adjusted by adjustment of the four point hitch to accommodate changes in ground contour.

8. The apparatus according claim 1 wherein the transfer rack comprising a pair of parallel horizontal forks which can be raised for engaging the pieces and can be moved horizontally from the transfer conveyer to the stack support for conveying the engaged pieces.

9. The apparatus according claim 1 wherein the stack support comprises a pair of horizontal parallel forks which can be lowered to deposit the stack onto a roller conveyer for discharge.

10. Apparatus for collecting, stacking and bundling elongate pieces comprising;
  a vehicle for moving in a direction of working movement across ground between stacks on the ground of the elongate pieces to be collected;
  a frame arranged for attachment to the vehicle;
  a receiving section on the frame for receiving the pieces thereon;
  an unscrambling and stacking assembly mounted on the frame including a row former for receiving the elongate pieces from the receiving section and for unscrambling and aligning the pieces side by side in a row and including a transfer section for stacking rows on top of one another to form a stack of the rows;
  the unscrambling and stacking assembly including a row former for receiving the elongate pieces for aligning the pieces side by side in a row and including a transfer section for stacking rows on top of one another to form a stack of the rows;
  and a bundling assembly for wrapping the stack of the rows with a strapping material;
  the receiving section, the unscrambling and stacking assembly and the bundling assembly being mounted on the frame for transportation with the vehicle across the ground;
  the bundling assembly comprising:
    a roller discharge conveyer for forwarding the stack from the unscrambling and stacking assembly;
    the roller discharge conveyer being arranged to move in a direction along the direction of working movement of the vehicle to a discharge end for discharging the stack when wrapped from the rear of the bundling assembly onto the ground;
    a rectangular surrounding frame structure for surrounding and enclosing the stack on the roller discharge conveyer and including a bottom frame piece, a top frame piece and two side frame pieces;
    a feed member for transporting the strapping material around the compressed stack in the frame structure for clamping of ends of the strapping material to form a loop, the feed member comprising an endless loop member extending around the frame and drivable along its length around the frame with a coupling member at one point on the loop member for receiving and transporting an end of the strapping material around the stack as the loop member passes around the frame;
    a first clamping assembly movable into engagement with one side of the stack for compressing the stack side to side;
    and a second clamping assembly movable into engagement with the top or bottom of the stack for compressing the stack top to bottom.

11. The apparatus according to claim 10 wherein the frame includes a first clamping assembly movable into engagement with one side of the stack for compressing the stack side to side and a second clamping assembly movable into engagement with the top or bottom of the stack for compressing the stack top to bottom.

12. The apparatus according to claim 10 wherein the endless loop member comprises a chain which is carried on sprockets at the corners of the frame.

13. The apparatus according to claim 10 wherein the first clamping assembly comprises a first clamping bar mounted on one side frame member and movable relative thereto by a hydraulic drive between the clamping bar and the frame member and wherein the second clamping assembly comprises a second clamping bar mounted on the top frame member and movable relative thereto by a hydraulic drive between the second clamping bar and the top frame member.

14. Apparatus for collecting, stacking and bundling elongate pieces comprising:
  a vehicle for moving in a direction of working movement across ground between stacks on the ground of the elongate pieces to be collected;
  a frame arranged for attachment to the vehicle;
  a feed conveyer mounted on the frame for receiving the pieces thereon and carrying the pieces in a longitudinal direction of the feed conveyer;
  an unscrambling and stacking assembly mounted on the frame including a row former for receiving the elongate pieces from the feed conveyer and for unscrambling and aligning the pieces side by side in a row and including a transfer section for stacking rows on top of one another to farm a stack of the rows;
  and a bundling assembly mounted on the frame for wrapping the stack of the rows with a bundling material;
  the feed conveyer, the unscrambling and stacking assembly and the bundling assembly being mounted on the frame for transportation with the vehicle across the ground;
  the row former of the unscrambling and stacking assembly includes an unscrambling hopper into which the pieces are deposited and an elevator for lifting the pieces one at a time, the unscrambling hopper having an end wall against which the pieces are fed and two side walls each on a respective side of the end wall with the side walls converging inwardly and downwardly to a bottom apex and the elevator being arranged up one side wall with piece engaging members thereon for engaging and lifting one piece at a time for discharging the pieces over the top of said one side wall onto said transfer conveyer, the unscrambling hopper being arranged such that the side walls are parallel to the longitudinal direction of the feed conveyer and the end wall is transverse to the longitudinal direction such that the pieces are fed with one end first along the longitudinal direction of the feed conveyer for the end of the pieces to engage the end wall when discharged from the feed conveyer.

15. Apparatus for collecting, stacking and bundling elongate pieces comprising:

a vehicle for moving in a direction of working movement across ground between stacks on the ground of the elongate pieces to be collected;

a frame arranged for attachment to the vehicle;

a piece picking assembly for picking the pieces from the ground;

a feed conveyer mounted on the frame for receiving the pieces thereon from the picking assembly;

an unscrambling and stacking assembly mounted on the frame including a row former for receiving the elongate pieces from the feed conveyer and for unscrambling and aligning the pieces side by side in a row and including a transfer section for stacking rows on top of one another to form a stack of the rows;

wherein the transfer section of the unscrambling and stacking assembly includes a transfer conveyer extending across the vehicle from the receiving section on the first side to the bundling assembly on the second side;

and wherein the transfer section of the unscrambling and stacking assembly includes a transfer rack for lifting a row of a predetermined number of the pieces from the transfer conveyer and moving the row generally horizontally from the transfer conveyer, and a stack support for receiving the moved rows deposited thereon and for moving the received rows downwardly to receive a next row on top of a previous row and a bundling assembly mounted on the frame for wrapping the stack of the rows with a bundling material;

the feed conveyer, the unscrambling and stacking assembly and the bundling assembly being mounted on the frame for transportation with the vehicle across the ground;

the bundling assembly including a roller discharge conveyer for forwarding the stack from the unscrambling and stacking assembly;

the roller discharge conveyer being arranged to move in a direction along the direction of working movement of the vehicle to a discharge end for discharging the stack when wrapped from the rear of the bundling assembly onto the ground.

* * * * *